United States Patent
Ono et al.

(10) Patent No.: US 11,364,561 B2
(45) Date of Patent: Jun. 21, 2022

(54) ARC START CONTROL METHOD FOR FORWARD AND REVERSE FEED ARC WELDING

(71) Applicant: DAIHEN CORPORATION, Osaka (JP)

(72) Inventors: Kohei Ono, Osaka (JP); Toshiaki Nakamata, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 477 days.

(21) Appl. No.: 16/477,706

(22) PCT Filed: Dec. 7, 2017

(86) PCT No.: PCT/JP2017/044077
§ 371 (c)(1),
(2) Date: Jul. 12, 2019

(87) PCT Pub. No.: WO2018/131345
PCT Pub. Date: Jul. 19, 2018

(65) Prior Publication Data
US 2019/0358724 A1 Nov. 28, 2019

(30) Foreign Application Priority Data
Jan. 16, 2017 (JP) .............................. JP2017-004913

(51) Int. Cl.
*B23K 9/067* (2006.01)
*B23K 9/09* (2006.01)
(Continued)

(52) U.S. Cl.
CPC ................ *B23K 9/067* (2013.01); *B23K 9/09* (2013.01); *B23K 9/125* (2013.01); *B23K 9/073* (2013.01)

(58) Field of Classification Search
CPC . B23K 9/06; B23K 9/067; B23K 9/09; B23K 9/125; B23K 9/073; B23K 9/124; B23K 9/133
(Continued)

(56) References Cited

U.S. PATENT DOCUMENTS

| 10,391,578 B2 | 8/2019 | Tanaka et al. |
| 2004/0016737 A1 | 1/2004 | Huismann et al. |

(Continued)

FOREIGN PATENT DOCUMENTS

| CN | 1478629 A | 3/2004 |
| CN | 1886225 A | 12/2006 |

(Continued)

OTHER PUBLICATIONS

U.S. Appl. No. 16/322,321 to Kohei Ono et al., filed Jan. 31, 2019.
(Continued)

*Primary Examiner* — Tu B Hoang
*Assistant Examiner* — Alba T Rosario-Aponte
(74) *Attorney, Agent, or Firm* — Greenblum & Bernstein, P.L.C.

(57) ABSTRACT

In an arc start control method for forward and reverse feed arc welding in which forward and reverse feed control of alternately switching a feed speed Fw of a welding wire between a forward feed period and a reverse feed period is performed to generate a short circuit period and an arc period to perform welding, at arc start, a pulse period Tp during which a pulse current is energized for a plurality of number of times is provided, and thereafter forward and reverse feed control is started from forward feed period of the welding wire. During the pulse period Tp, a forward feed speed Fp of the welding wire is set so that the arc period is continuous. In addition, the forward feed speed Fp is
(Continued)

changed based on a time length of pulse period Tp and/or a value of a welding voltage Vw during pulse period Tp.

2 Claims, 4 Drawing Sheets

(51) Int. Cl.
  *B23K 9/12* (2006.01)
  *B23K 9/073* (2006.01)
(58) Field of Classification Search
  USPC .... 219/130.4, 130.1, 130.5, 130.51, 137 PS, 219/137 R, 137.2, 137.7, 130.33
  See application file for complete search history.

(56) References Cited

U.S. PATENT DOCUMENTS

| | | | |
|---|---|---|---|
| 2007/0102405 A1 | 5/2007 | Prinz et al. | |
| 2012/0097654 A1* | 4/2012 | Kawamoto | B23K 9/067 |
| | | | 219/125.1 |
| 2014/0203003 A1* | 7/2014 | Fujiwara | B23K 9/0735 |
| | | | 219/125.1 |
| 2015/0041449 A1* | 2/2015 | Fujiwara | B23K 9/095 |
| | | | 219/130.21 |
| 2017/0225253 A1* | 8/2017 | Matsuoka | B23K 9/09 |
| 2017/0225256 A1 | 8/2017 | Takada et al. | |
| 2017/0252850 A1 | 9/2017 | Ide | |
| 2017/0355034 A1* | 12/2017 | Matsuoka | B23K 9/073 |

FOREIGN PATENT DOCUMENTS

| | | | |
|---|---|---|---|
| CN | 103747909 A | 4/2014 | |
| CN | 103974799 A | 8/2014 | |
| JP | H09-271942 A | 10/1997 | |
| WO | 2012/162582 A1 | 11/2012 | |
| WO | 2013/136643 | 9/2013 | |
| WO | 2016/039113 | 3/2016 | |
| WO | WO-2016039113 A1 * | 3/2016 | B23K 9/00 |
| WO | 2016/075871 | 5/2016 | |
| WO | 2016/080166 | 5/2016 | |

OTHER PUBLICATIONS

U.S. Appl. No. 16/338,870 to Kohei Ono et al., filed Apr. 2, 2019.
U.S. Appl. No. 16/477,646 to Kohei Ono et al., filed Jul. 12, 2019.
International Search Report issued in International Bureau of WIPO Patent App. No. PCT/JP2017/044077, dated Jan. 16, 2018 (with English translation).
Written Opinion of the International Searching Authority issued in International Bureau of WIPO Patent App. No. PCT/JP2017/044077, dated Jan. 16, 2018 (with English translation).
Chinese Office Action, Chinese Patent Office, Application No. 201780076098.0, dated Jan. 27, 2021, English translation (with pp. 3-4 of the English translation being a machine translation).

\* cited by examiner

ARC START CONTROL METHOD FOR FORWARD AND REVERSE FEED ARC WELDING

TECHNICAL FIELD

The present invention relates to an arc start control method for forward and reverse feed arc welding in which forward and reverse feed control of alternately switching a feed speed of a welding wire between a forward feed period and a reverse feed period is performed to generate a short circuit period and an arc period to perform welding.

BACKGROUND ART

In general consumable electrode-type arc welding, the welding is performed by feeding a welding wire as a consumable electrode at a constant speed, and generating an arc between the welding wire and a base material. In the consumable electrode-type arc welding, a welding state of alternately repeating the welding wire and the base material in a short circuit period and an arc period is often obtained.

In order to further improve the welding quality, it is common practice to perform welding by performing forward and reverse feed control in which the feed speed of the welding wire is switched alternately between a forward feed period and a reverse feed period.

In the forward and reverse feed arc welding control method, at arc start, the welding wire is fed forward, the welding wire is brought into contact with the base material and the welding current is energized, and then the welding is started by performing forward and reverse feed control from the reverse feed period of welding wire (see, for example, Patent Literature 1).

PRIOR ART

Patent Literature

Patent Literature 1: WO 2016/039113

SUMMARY OF INVENTION

Problem to be Solved by the Invention

In the forward and reverse feed arc welding control method, stable welding can be performed during a steady welding period. However, in the forward and reverse feed arc welding control method, there is a problem that the bead appearance at a welding start portion is inferior to that of usual arc welding method in which only the forward feed is performed. This tends to cause the bead appearance at the start of welding to be convex, and the match between the bead and the base material at a toe portion to deteriorate. When the material of the base material is an aluminum material, this problem is significant.

Therefore, an object of the present invention is to provide an arc start control method for forward and reverse feed arc welding, which is capable of improving the quality of the weld bead at the welding start portion in the forward and reverse feed arc welding control method.

Means for Solving the Problem

In order to solve the above object, an arc start control method for forward and reverse feed arc welding of the present disclosure is characterized in that:

an arc start control method for forward and reverse feed arc welding in which forward and reverse feed control of alternately switching a feed speed of a welding wire between a forward feed period and a reverse feed period is performed to generate a short circuit period and an arc period to perform welding, wherein at arc start, a pulse period during which a pulse current is energized for a plurality of number of times is provided, and thereafter the forward and reverse feed control is started from the forward feed period of the welding wire.

In the arc start control method for forward and reverse feed arc welding according to the present disclosure, the welding wire is fed forward during the pulse period.

In the arc start control method for forward and reverse feed arc welding according to the present disclosure, the pulse period is set to a predetermined period or a period in which the pulse current has a predetermined number of cycles.

In the arc start control method for forward and reverse feed arc welding according to the present disclosure, a speed of the forward feed is set so that the arc period is continuous during the pulse period.

In the arc start control method for forward and reverse feed arc welding according to the present disclosure, the speed of the forward feed is changed based on a time length of the pulse period and/or a welding voltage value during the pulse period.

In the arc start control method for forward and reverse feed arc welding according to the present disclosure, during the pulse period, a pull-side feed motor which performs the forward and reverse feed control and a push-side feed motor which performs forward feed control are included, and an acceleration period of the pull-side feed motor is shorter than an acceleration period of the push-side feed motor at the start of the pulse period.

In the arc start control method for forward and reverse feed arc welding according to the present disclosure, the acceleration period of the push-side feed motor at the start of the pulse period is set to a period longer than the pulse period.

Advantageous Effects of Invention

According to the present invention, the quality of the weld bead at the welding start portion can be improved in the forward and reverse feed arc welding control method.

EMBODIMENTS FOR CARRYING OUT THE INVENTION

Hereinafter, embodiments of the present invention will be described with reference to the drawings.

First Embodiment

Figure 1:
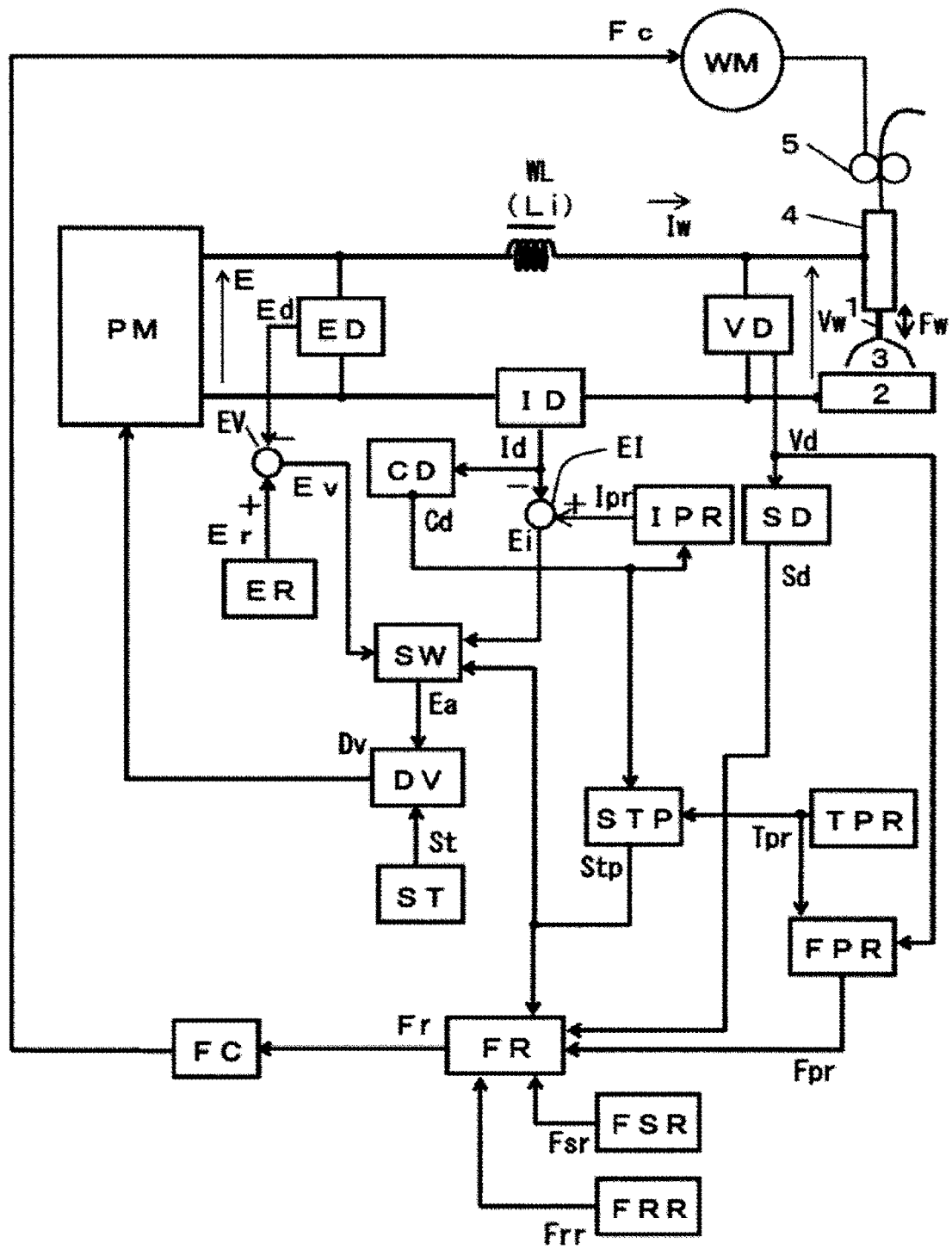
FIG. 1 is a block diagram of a welding power source for performing an arc start control method for forward and reverse feed arc welding according to a first embodiment of the present invention.

FIG. 1 is a block diagram of a welding power source for performing an arc start control method for forward and reverse feed arc welding according to a first embodiment of the present invention. Hereinafter, each block will be described below with reference to FIG. 1.

A power source main circuit PM receives an output from a 3-phase 200 V commercial power source (not shown) or the like, performs output control by inverter control according to a drive signal Dv to be described later, and outputs an output voltage E. The power source main circuit PM includes a primary rectifier for rectifying the commercial power source, a smoothing capacitor for smoothing a rectified direct current, an inverter circuit driven by the drive signal Dv and converting the smoothed direct current into a high-frequency alternating current, a high-frequency transformer for stepping down the high-frequency alternating current to a voltage value suitable for welding, and a secondary rectifier for rectifying the step-down high-frequency alternating current into a direct current, which are not shown.

A reactor WL smoothes the output voltage E. The inductance value of the reactor WL is, for example, 100 µH.

A feed motor WM receives a feed control signal Fc to be described later as an input and alternately switches forward feed and reverse feed to feed a welding wire 1 at a feed speed Fw. A motor with fast transient response is used as the feed motor WM. In order to increase the change rate of the feed speed Fw of the welding wire 1 and speed up the reversal of the feed direction, the feed motor WM may be provided near a tip of a welding torch 4.

The welding wire 1 is fed inside the welding torch 4 by the rotation of a feed roll 5 coupled to the feed motor WM, and an arc 3 is generated between the welding wire 1 and a base material 2. A welding voltage Vw is applied between a power source tip (not shown) in the welding torch 4 and the base material 2, and thus a welding current Iw is energized.

An output voltage setting circuit ER outputs a predetermined output voltage setting signal Er. An output voltage detection circuit ED detects and smoothes the output voltage E and outputs an output voltage detection signal Ed.

A voltage error amplification circuit EV receives the output voltage setting signal Er and the output voltage detection signal Ed as inputs, amplifies an error between the output voltage setting signal Er(+) and the output voltage detection signal Ed(−), and outputs a voltage error amplification signal Ev. With this circuit, the welding power source is subjected to constant voltage control.

A current detection circuit ID detects the welding current Iw and outputs a current detection signal Id.

A current energization determination circuit CD receives the current detection signal Id as an input, determines that the welding current Iw is energized when the value of the current detection signal Id is equal to or larger than a threshold value (about 10 A), and outputs a current energization determination signal Cd which is at a high level.

A pulse current setting circuit IPR receives the current energization determination signal Cd as an input, takes a predetermined peak current value during a predetermined peak period, then takes a predetermined base current value during a predetermined base period, and thereafter repeats the peak period and the base period when the current energization determination signal Cd changes to be in a high level, and outputs a pulse current setting signal Ipr.

A current error amplification circuit EI receives the pulse current setting signal Ipr and the current detection signal Id as inputs, amplifies an error between the pulse current setting signal Ipr(+) and the current detection signal Id(−), and outputs a current error amplification signal Ei. With this circuit, the welding power source is subjected to constant current control during the pulse period.

A pulse period setting circuit TPR outputs a predetermined pulse period setting signal Tpr. The pulse period setting signal Tpr may be set to a predetermined period, or may be set to a period in which the pulse current has a predetermined number of cycles.

A pulse period timer circuit STP receives the current energization determination signal Cd and the pulse period setting signal Tpr as inputs, and outputs a pulse period timer signal Stp which is in a high level during a pulse period Tp determined by the pulse period setting signal Tpr from the time when the current energization determination signal Cd changes to be at a high level (energization).

A power source characteristic switching circuit SW receives the current error amplification signal Ei, the voltage error amplification signal Ev and the pulse period timer signal Stp as inputs, outputs the current error amplification signal Ei as an error amplification signal Ea during the pulse period Tp when the pulse period timer signal Stp is at a high level, and outputs the voltage error amplification signal Ev as an error amplification signal Ea during a steady welding period when the pulse period timer signal Stp is at a low level. With this circuit, the welding power source is subjected to constant current control during the pulse period Tp, and is subjected to constant voltage control during the steady welding period.

A voltage detection circuit VD detects the welding voltage Vw and outputs a voltage detection signal Vd. A short circuit determination circuit SD receives the voltage detection signal Vd as an input, and outputs a short circuit determination signal Sd which is determined to be at a short circuit period and at a high level when the value of the voltage detection signal Vd is less than a short circuit determination value (about 10 V), and is determined to be at an arc period and at a low level when the value of the voltage detection signal Vd is equal to or larger than the short circuit determination value.

A welding start circuit ST outputs a welding start signal St which is at a high level when the welding power source is started. The welding start circuit ST corresponds to a start switch of the welding torch 4, a programmable logic controller for controlling a welding process, a robot control device, or the like.

A drive circuit DV receives the error amplification signal Ea and the welding start signal St as inputs, performs PWM modulation control based on the error amplification signal Ea when the welding start signal St is at a high level (welding start), and outputs the drive signal Dv for driving the inverter circuit in the power source main circuit PM.

A pulse period forward feed speed setting circuit FPR receives the pulse period setting signal Tpr and the voltage detection signal Vd as inputs, and outputs a pulse period forward feed speed setting signal Fpr calculated based on a predetermined function to which both the above values are input. This function is set, for example, as follows. The initial value of Fpr is set according to the value of the pulse period setting signal Tpr. Then, the initial value is corrected based on the average value (smooth value) of the voltage detection signal Vd during the pulse period Tp. The larger the value of the pulse period setting signal Tpr (the longer the pulse period Tp), the larger the initial value. In addition, the larger the average value of the voltage detection signal Vd, the larger the value of Fpr. The value of Fpr may be changed according to either the pulse period setting signal Tpr or the voltage detection signal Vd.

A forward feed peak value setting circuit FSR outputs a predetermined forward feed peak value setting signal Fsr. A reverse feed peak value setting circuit FRR outputs a predetermined reverse feed peak value setting signal Frr.

A feed speed setting circuit FR receives the pulse period forward feed speed setting signal Fpr, the forward feed peak value setting signal Fsr, the reverse feed peak value setting signal Frr, the pulse period timer signal Stp and the short circuit determination signal Sd as inputs, performs the process to be described later with reference to FIG. 2 and outputs a feed speed setting signal Fr.

A feed control circuit FC receives the feed speed setting signal Fr as an input and outputs a feed control signal Fc for feeding the welding wire 1 at a feed speed Fw equivalent to the value of the feed speed setting signal Fr to the feed motor WM.

Figure 2:
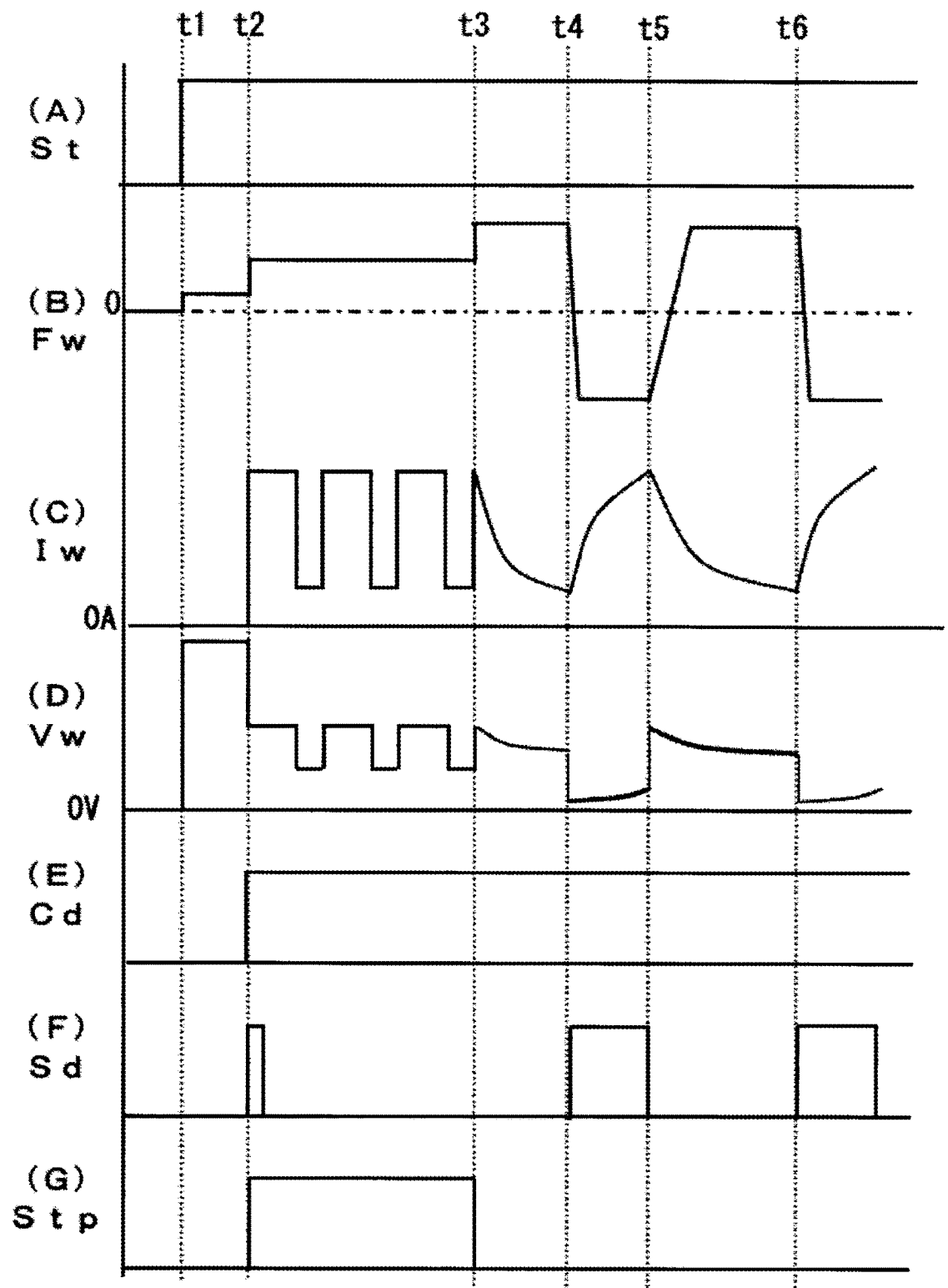
FIG. 2 is a timing chart of each signal in the welding power source of FIG. 1 showing the arc start control method for forward and reverse feed arc welding according to the first embodiment of the present invention.

FIG. 2 is a timing chart of each signal in the welding power source of FIG. 1 showing the arc start control method for forward and reverse feed arc welding according to the first embodiment of the present invention. In FIG. 2, (A) shows the change of the welding start signal St with time, (B) shows the change of the feed speed Fw with time, (C) shows the change of the welding current Iw with time, (D) shows the change of the welding voltage Vw with time, (E) shows the change of the current energization determination signal Cd with time, (F) shows the change of the short circuit determination signal Sd with time, and (G) shows the change of the pulse period timer signal Stp with time. The operation of each signal at arc start will be described below with reference to FIG. 2.

As shown in (B) of FIG. 2, it is a forward feed period when the feed speed Fw is above 0, and it is a reverse feed period when the feed speed Fw is below 0. The forward feed is to feed the welding wire 1 in a direction close to the base material 2, and the reverse feeding is to feed the welding wire 1 in a direction away from the base material 2.

As shown in (A) of FIG. 2, at a time point t1, when the welding start signal St changes to be at a high level (welding start), the feed speed Fw changes from 0 to a predetermined positive slow-down speed, and the welding wire 1 is fed forward, as shown in (B) of FIG. 2. The slow-down speed is set to a small value of about 1 m/min to 2 m/min. At the same time, at the time point t1, since the welding power source is started, the welding voltage Vw becomes a no-load voltage value of the maximum output voltage value, as shown in (D) of FIG. 2. As shown in (C) of FIG. 2, the welding current Iw is 0 A because it is not energized.

At a time point t2, when the welding wire 1 is brought into contact with the base material 2 due to the above forward feed, the welding current Iw is energized to generate the arc 3. As shown in (D) of FIG. 2, since the welding voltage Vw sharply decreases to a short circuit voltage value of several volts, and the value of the welding voltage Vw is less than a predetermined short circuit determination value (about 10 V), the short circuit determination signal Sd changes into a high level (short circuit) as shown in (F) of FIG. 2. Immediately after the short circuit is released, the arc 3 is generated, so that the short circuit determination signal Sd changes into a low level. At the same time, at the time point t2, the welding current Iw starts to be energized as shown in (C) of FIG. 2, and the current energization determination signal Cd changes into a high level (energization) as shown in (E) of FIG. 2. In response to this, as shown in (G) of FIG. 2, the pulse period timer signal Stp changes into a high level, and then maintains at the high level during the pulse period Tp from the time points t2 to t3 determined by the pulse period setting signal Tpr.

As shown in (C) of FIG. 2, during the pulse period Tp, the pulse current determined by the pulse current setting signal Ipr is energized. The pulse current has a waveform which repeats a predetermined peak period having a predetermined peak current value and a predetermined base period having a predetermined base current value as one cycle. As shown in (D) of FIG. 2, the welding voltage Vw has a pulse waveform proportional to the arc length. The pulse period Tp is set to a predetermined period or a period in which the pulse current has a predetermined number of cycles. Waveform parameters (peak current value, peak period, base current value, base period) of the pulse current and pulse period Tp are set to values at which the toe portion of the weld bead at the welding start portion is well matched and has a flat shape. For example, when the material of base material 2 is aluminum, it is set that peak current value=350 A, peak period=1.5 ms, base current value=50 A, base period=1.5 ms, and pulse period Tp=10 ms to 50 ms.

As shown in (B) of FIG. 2, during the pulse period Tp, the feed speed Fw is a forward feed speed Fp determined by the pulse period forward feed speed setting signal Fpr. The forward feed speed Fp is set so that the arc period is continuous during the pulse period. For example, the forward feed speed Fp is set to be 10 m/min.

In addition, the forward feed speed Fp may be changed based on the time length and/or the welding voltage Vw during the pulse period Tp. This is because the arc length becomes longer as the pulse period Tp becomes longer, so that the forward feed speed Fp is increased to prevent the arc length from being longer. Since the average value of the welding voltage Vw is proportional to the arc length, the arc length is detected according to the welding voltage Vw, and when the arc length becomes longer, the forward feed speed Fp is increased to prevent the arc length from being longer. When the arc length becomes longer, the shield state is insufficient and the arc state is unstable. Further, when the arc length becomes longer, a large amount of smut (soot) is generated and the bead appearance is worse.

At the time point t3, as shown in (G) of FIG. 2, when the pulse period timer signal Stp changes into a low level, the pulse period Tp ends and the steady welding period starts. The steady welding period starts from the forward feed period, and the forward feed period ends when a short circuit is generated at a time point t4. As shown in (B) of FIG. 2, during the forward feed period from the time points t3 to t4, the welding wire is fed forward at a predetermined forward feed speed. The forward feed speed is set independently of the forward feed speed Fp in the pulse period Tp and a forward feed peak value Fs to described later, and is set to a value same as or a different from the above two values. An arc current is energized as shown in (C) of FIG. 2 and an arc voltage is applied as shown in (D) of FIG. 2. As shown in (F) of FIG. 2, during this period, since the arc period occurs, the short circuit determination signal Sd remains at a low level.

When the short circuit is generated due to the forward feed of the welding wire at the time point t4, the welding voltage Vw sharply decreases to a short circuit voltage value of approximately 0 V as shown in (D) of FIG. 2, so that the short circuit determination signal Sd changes into a high level as shown in (F) of FIG. 2. In response to this, as shown in (B) of FIG. 2, the feed speed Fw changes with a slope from the forward feed speed to a reverse feed peak value Frp determined by the reverse feed peak value setting signal Frr. The reverse feed period continues until the arc 3 is regenerated at a time point t5. During the short circuit period from the time points t4 to t5, as shown in (C) of FIG. 2, the welding current Iw gradually increases, and as shown in (D) of FIG. 2, the welding voltage Vw remains at the short circuit voltage value.

When a droplet is transferred due to the pinch force caused by the energization of the welding current Iw and the reverse feed of the welding wire and the arc 3 is regenerated at the time point t5, the welding voltage Vw rapidly increases to arc voltage value of several tens of volts as shown in (D) of FIG. 2, so that the short circuit determination signal Sd changes into a low level as shown in (F) of FIG. 2. In response to this, as shown in (B) of FIG. 2, the feed speed Fw changes with a slope from the reverse feed peak value Frp to the forward feed peak value Fs determined by the forward feed peak value setting signal Fsr. The forward feed period continues until the short circuit is regenerated at a time point t6. During the arc period from the time points t5 to t6, as shown in (C) of FIG. 2, the welding current Iw gradually decreases, and as shown in (D) of FIG. 2, the welding voltage Vw becomes an arc voltage value. After this, the forward and reverse feed arc welding from the time points t4 to t6 is repeated. The feed speed Fw during the steady welding period has a waveform which changes into substantially trapezoidal shape having positive or negative values, and the average value thereof is a positive value. Therefore, the welding wire 1 is fed forward on average.

Hereinafter, the operational effects of the first embodiment will be described. According to the first embodiment, at arc start, the pulse period during which a pulse current is energized for a plurality of number of times is provided, and thereafter the forward and reverse feed control is started from the forward feed period of the welding wire. The heat input to the base material can be increased by energizing the pulse current at the arc start. Thus, the bead at the welding start portion can be made into a flat shape, and the match of the toe portion can be improved. Further, according to first embodiment, the switching from the pulse period to the forward and reverse feed control is started from the forward feed period. Accordingly, the welding state can be switched smoothly without being unstable.

More preferably, in the first embodiment, the welding wire is fed forward during the pulse period. Accordingly, the welding state can be stabilized during the pulse period.

More preferably, in the first embodiment, the pulse period is set to a predetermined period or a period in which the pulse current has a predetermined number of cycles. Accordingly, the heat input to the welding start portion can be set to an appropriate value. As a result, the bead at the welding start portion and the bead at a steady welding portion can be made into a substantially identical shape, and the welding quality can be improved.

More preferably, in the first embodiment, the forward feed speed of the welding wire is set so that the arc period is continuous during the pulse period. Accordingly, since almost no short circuit is generated during the pulse period, the heat input to the base material during the pulse period can be accurately controlled. As a result, the variation in the bead shape of the welding start portion can be prevented.

More preferably, in the first embodiment, the forward feed speed is changed based on the time length of the pulse period and/or the welding voltage value during the pulse period. The arc length becomes longer as the pulse period becomes longer. Therefore, as the time length of the pulse period becomes longer, the arc length can be maintained at an appropriate value by increasing the forward feed speed. In addition, since the arc length can be detected according to the welding voltage, the arc length can be maintained at an appropriate value by changing the forward feed speed according to the welding voltage. As a result, the welding state can be prevented from being unstable during the pulse period.

Second Embodiment

The invention of the second embodiment includes a push-side feed motor which performs forward feed control in addition to the pull-side feed motor which performs the forward and reverse feed control of the first embodiment.

Figure 3:
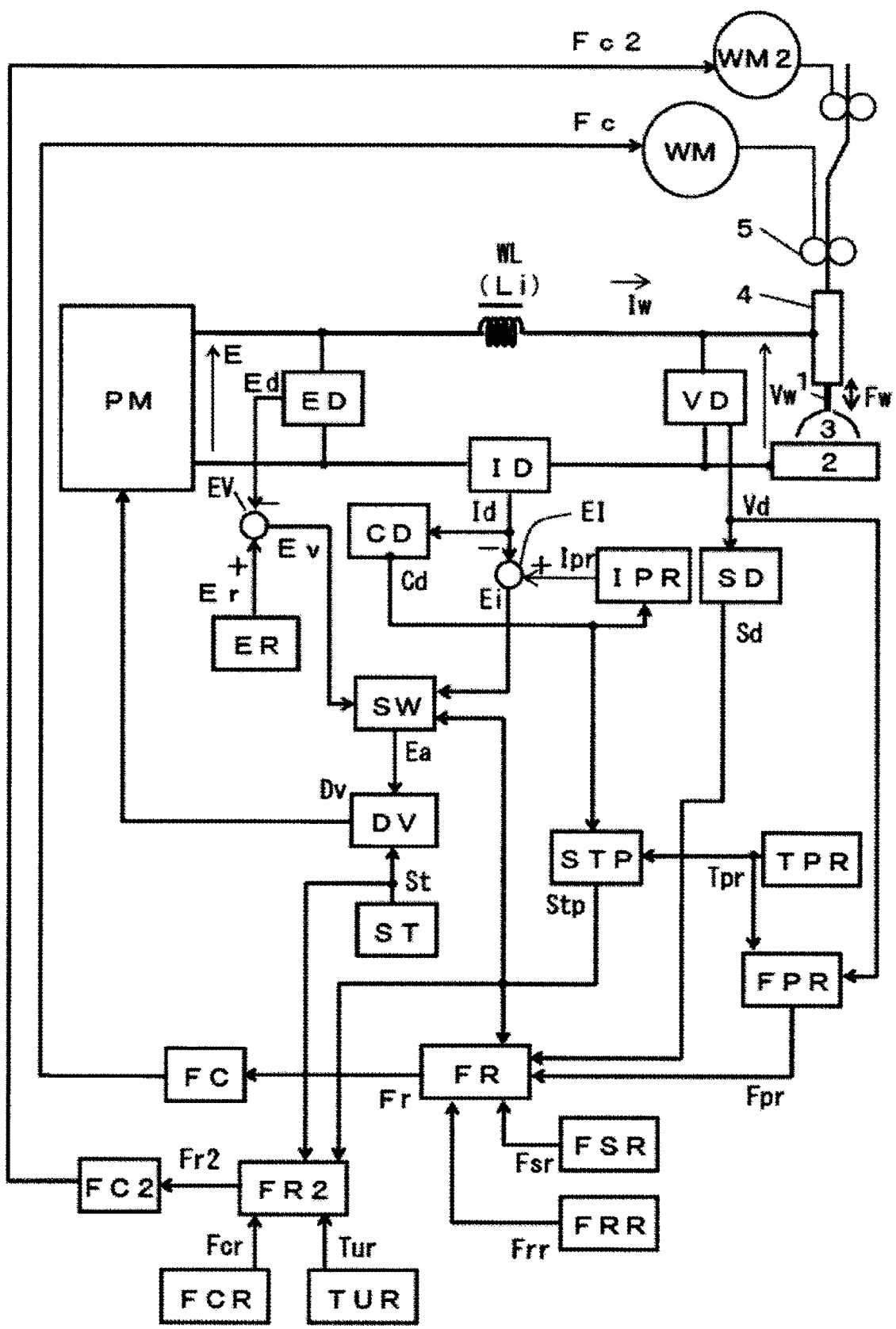
FIG. 3 is a block diagram of a welding power source for performing an arc start control method for forward and reverse feed arc welding according to a second embodiment of the present invention.

FIG. 3 is a block diagram of a welding power source for performing an arc start control method for forward and reverse feed arc welding according to the second embodiment of the present invention. FIG. 3 corresponds to FIG. 1 described above, in which the same reference numerals are attached to the same blocks, and description thereof will not be repeated. In FIG. 3, a push-side feed motor WM2, a steady feed speed setting circuit FCR, an acceleration period setting circuit TUR, a second feed speed setting circuit FR2 and a second feed control circuit FC2 are added to the configuration in FIG. 1. Hereinafter, the blocks will be described below with reference to FIG. 3.

The feed motor WM shown in FIG. 1 serves as a pull-side feed motor in FIG. 3 and is provided on a downstream side of the feed system. The forward and reverse feed control for the pull-side feed motor WM is the same as that of the first embodiment. The push-side feed motor WM2 is newly provided on the upstream side of the feed system. The push-side feed motor WM2 is subjected to forward feed control with a second feed control signal Fc2 to be described later.

The steady feed speed setting circuit FCR outputs a predetermined steady feed speed setting signal Fcr. The value of the steady feed speed setting signal Fcr is set to a value substantially same as the average value of the feed speed setting signal Fr to the pull-side feed motor WM during the steady welding period.

An acceleration period setting circuit TUR outputs a predetermined acceleration period setting signal Tur. The value of the acceleration period setting signal Tur is set to a value larger than the value of the pulse period setting signal Tpr. That is, pulse period Tp<acceleration period Tu.

The second feed speed setting circuit FR2 receives the welding start signal St, the pulse period timer signal Stp, the acceleration period setting signal Tur, and the steady feed speed setting signal Fcr as inputs, performs the process to be described later with reference to FIG. 4, and outputs a second feed speed setting signal Fr2.

The second feed control circuit FC2 receives the second feed speed setting signal Fr2 as an input, and outputs, to the push-side feed motor WM2, a second feed control signal Fc2 for rotating the push-side feed motor WM2 at a feed speed corresponding to the value of the second feed speed setting signal Fr2.

Figure 4:
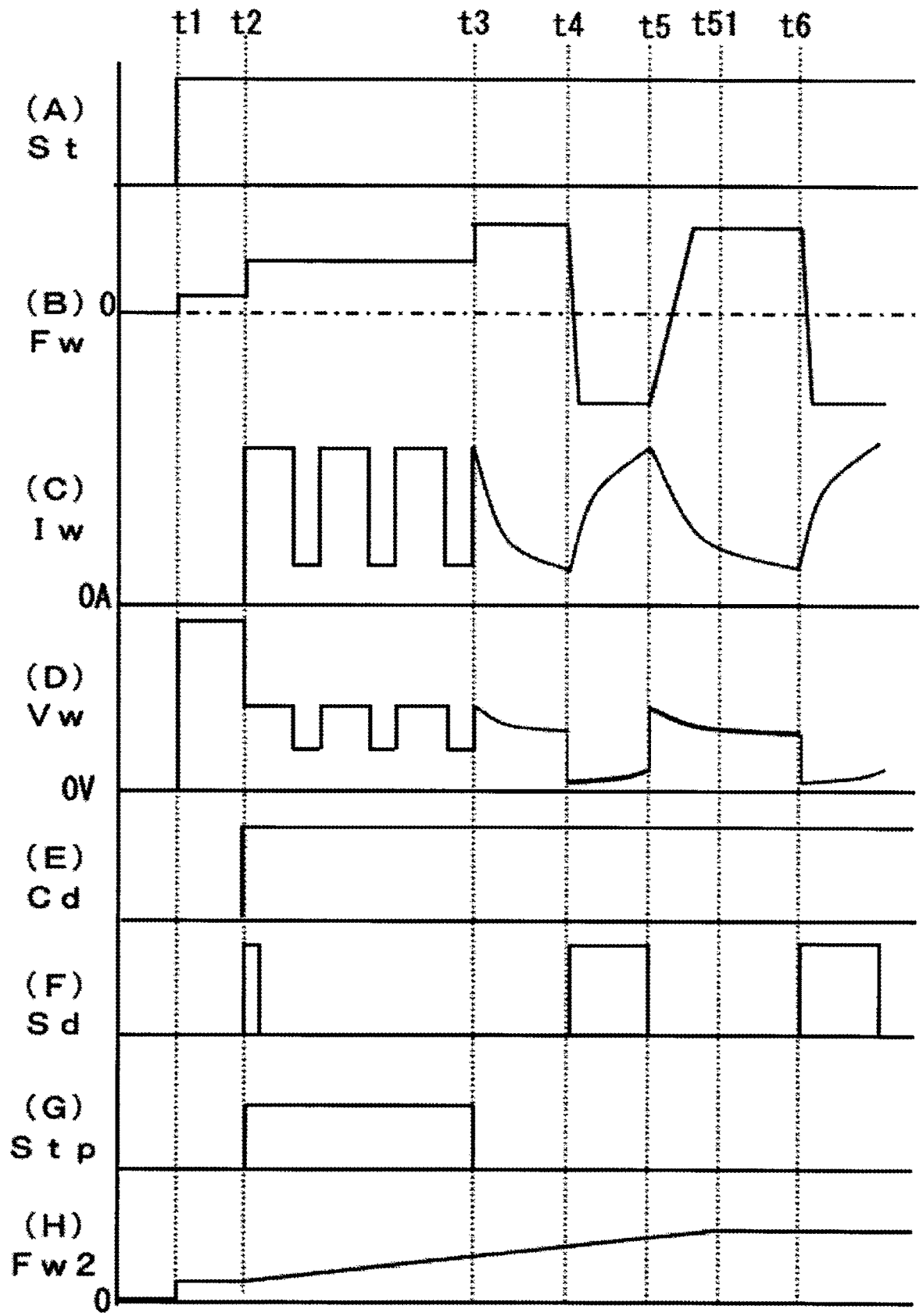
FIG. 4 is a timing chart of each signal in the welding power source of FIG. 3 showing the arc start control method for forward and reverse feed arc welding according to the second embodiment of the present invention.

FIG. 4 is a timing chart of each signal in the welding power source of FIG. 3 showing the arc start control method for forward and reverse feed arc welding according to the second embodiment of the present invention. In FIG. 4, (A) shows the change of the welding start signal St with time, (B) shows the change of the pull-side feed speed Fw with time, (C) shows the change of the welding current Iw with time, (D) shows the change of the welding voltage Vw with time, (E) shows the change of the current energization determination signal Cd with time, (F) shows the change of the short circuit determination signal Sd with time, (G) shows the change of the pulse period timer signal Stp with time, and (H) shows the change of a push-side feed speed Fw2 with time. FIG. 4 corresponds to FIG. 2 described above, and is obtained by adding the push-side feed speed Fw2 shown in (H) of FIG. 4 to FIG. 2. The operation of each signal other than the push-side feed speed Fw2 is the same as that of FIG. 2, so that the description will not be repeated. Hereinafter, the operation of the push-side feed speed Fw2 at the start of welding will be described with reference to FIG. 4.

When the welding start signal St shown in (A) of FIG. 4 changes into a high level (welding start) at the time point t1, the pull-side feed speed Fw changes from 0 to a predetermined positive slow-down speed as shown in (B) of FIG. 4, and the push-side feed speed Fw2 changes from 0 to a predetermined positive second slow-down speed as shown in (H) of FIG. 4, and the welding wire is fed forward at a low speed. The slow-down speed and the second slow-down speed are set to substantially the same value.

When the welding wire 1 is brought into contact with the base material 2 and the welding current Iw is energized to generate the arc 3 at the time point t2, the current energization determination signal Cd changes into a high level as shown in (E) of FIG. 4. In response to this, the pull-side feed speed Fw is rapidly accelerated to a predetermined forward feed speed Fp as shown in (B) of FIG. 4. On the other hand, as shown in (H) of FIG. 4, the push-side feed speed Fw2 is gradually accelerated and converges to a steady feed speed determined by the steady feed speed setting signal Fcr at a time point t51 between the time points t5 and t6.

The acceleration period of the pull-side feed speed Fw is set to a time shorter than the acceleration period Tu of the push-side feed speed Fw2. The acceleration period of the pull-side feed speed Fw is set to about 0.5 ms to 5 ms. The acceleration period Tu of the push-side feed speed Fw2 is set to about 20 ms to 100 ms by the acceleration period setting signal Tur. In this way, the transition to a state where the arc length becomes an appropriate value after the arc is generated at the time point t2 is made smoother. Thus, spattering at the arc start can be reduced.

The acceleration period Tu of the push-side feed speed Fw2 is preferably set to a period longer than the pulse period Tp. In this way, the transition from the pulse period Tp to the steady welding period is made smoother, and the welding quality is further improved.

In the second embodiment, the pull-side feed motor which performs the forward and reverse feed control and the push-side feed motor which performs forward feed control are included, and the acceleration period of the pull-side feed motor at the start of the pulse period is set to a period shorter than the acceleration period of the push-side feed motor. Accordingly, in the second embodiment, in addition to the effects of the first embodiment, the spattering at the arc start can be further reduced.

More preferably, in second embodiment, the acceleration period of the push-side feed motor at the start of the pulse period is set to a period longer than the pulse period. Accordingly, in the second embodiment, the transition from the pulse period to the steady welding period can be made smoother.

INDUSTRIAL APPLICABILITY

According to the present invention, the quality of the weld bead at the welding start portion can be improved in the forward and reverse feed arc welding control method.

This application is based on the Japanese patent application (Japanese patent application No. 2017-004913) filed on Jan. 16, 2017, the contents of which are incorporated herein by reference.

DESCRIPTION OF REFERENCE NUMERALS

1 Welding wire
2 Base material
3 Arc
4 Welding torch
5 Feed roll
CD Current energization determination circuit
Dd Current energization determination signal
DV Drive circuit
Dv Drive signal
E Output voltage
Ea Error amplification signal
ED Output voltage detection circuit
Ed Output voltage detection signal
EI Current error amplification circuit
Ei Current error amplification signal
ER Output voltage setting circuit
Er Output voltage setting signal
EV Voltage error amplification circuit
Ev Voltage error amplification signal
FC Feed control circuit
Fc Feed control signal
FC2 Second feed control circuit
Fc2 Second feed control signal
FCR Steady feed speed setting circuit
Fcr Steady feed speed setting signal
Fp Forward feed speed
FPR Pulse period forward feed speed setting circuit
Fpr Pulse period forward feed speed setting signal
FR Feed speed setting circuit
Fr Feed speed setting signal
FR2 Second feed speed setting circuit
Fr2 Second feed speed setting signal
Frp Reverse feed peak value
FRR Reverse feed peak value setting circuit
Frr Reverse feed peak value setting signal
Fs Forward feed peak value
FSR Forward feed peak value setting circuit
Fsr Forward feed peak value setting signal
Fw Feed speed/Pull-side feed speed
Fw2 Push-side feed speed
ID Current detection circuit
Id Current detection signal
IPR Pulse current setting circuit
Ipr Pulse current setting signal
Iw Welding current
PM Power source main circuit
SD Short circuit determination circuit
Sd Short circuit determination signal
ST Welding start circuit
St Welding start signal
STP Pulse period timer circuit
Stp Pulse period timer signal
SW Power source characteristic switching circuit
Tp Pulse period
TPR Pulse period setting circuit Tpr Pulse period setting signal
Tu Acceleration period
TUR Acceleration period setting circuit
Tur Acceleration period setting signal
VD Voltage detection circuit
Vd Voltage detection signal
Vw Welding voltage
WL Reactor
WM Feed motor/Pull-side feed motor
WM2 Push-side feed motor

The invention claimed is:

1. An arc start control method for forward and reverse feed arc welding comprising forward and reverse feed control of alternately switching a feed speed of a welding wire between a forward feed period and a reverse feed period that is performed to generate a short circuit period and an arc period to perform welding, wherein, at arc start, a pulse period during which a pulse current is energized for a plurality of number of times is provided, and thereafter the forward and reverse feed control is started from the forward feed period of the welding wire, wherein the welding wire is fed forward during the pulse period, wherein a pull-side feed motor which performs the forward and reverse feed control and a push-side feed motor which performs forward feed control are included, and an acceleration period of the pull-side feed motor is shorter than an acceleration period of the push-side feed motor at a start of the pulse period.

2. The arc start control method for forward and reverse feed arc welding according to claim 1, wherein the acceleration period of the push-side feed motor at the start of the pulse period is set to a period longer than the pulse period.

* * * * *